US011958525B2

(12) United States Patent
Tinnin

(10) Patent No.: US 11,958,525 B2
(45) Date of Patent: Apr. 16, 2024

(54) AUTOMATIC STOW COLUMN

(71) Applicant: STEERING SOLUTIONS IP HOLDING CORPORATION, Saginaw, MI (US)

(72) Inventor: Lee M. Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/080,753

(22) Filed: Dec. 14, 2022

(65) Prior Publication Data

US 2023/0182803 A1 Jun. 15, 2023

Related U.S. Application Data

(60) Provisional application No. 63/289,954, filed on Dec. 15, 2021.

(51) Int. Cl.
*B62D 1/183* (2006.01)
*B62D 1/181* (2006.01)
*B62D 1/185* (2006.01)

(52) U.S. Cl.
CPC .............. *B62D 1/183* (2013.01); *B62D 1/181* (2013.01); *B62D 1/185* (2013.01)

(58) Field of Classification Search
CPC ........ B62D 1/183; B62D 1/181; B62D 1/185; B62D 1/197
See application file for complete search history.

(56) References Cited

U.S. PATENT DOCUMENTS

| | | | | | |
|---|---|---|---|---|---|
| 4,337,967 | A | * | 7/1982 | Yoshida | B62D 1/197 74/493 |
| 5,482,320 | A | * | 1/1996 | Passebecq | B62D 1/197 74/492 |
| 6,170,862 | B1 | * | 1/2001 | Hoagland | B62D 1/192 280/731 |
| 2003/0227159 | A1 | * | 12/2003 | Muller | B60R 21/2032 280/731 |
| 2004/0211612 | A1 | * | 10/2004 | Muller | B60R 21/2035 180/274 |
| 2020/0172149 | A1 | * | 6/2020 | Appleyard | B62D 1/192 |

FOREIGN PATENT DOCUMENTS

| | | | | |
|---|---|---|---|---|
| DE | 4421509 | A1 * | 12/1995 | ............. B62D 1/197 |
| DE | 29514314 | U1 * | 12/1995 | |
| EP | 0417730 | B1 * | 5/1996 | |
| EP | 0805093 | A1 * | 11/1997 | |
| EP | 1077863 | B1 * | 6/2008 | ........... B60R 21/203 |
| TW | I328541 | B * | 8/2010 | |

* cited by examiner

*Primary Examiner* — Drew J Brown
(74) *Attorney, Agent, or Firm* — Dickinson Wright PLLC

(57) ABSTRACT

A telescoping steering column having a lower jacket extending along a central axis between a lower jacket lower end and a lower jacket upper end and an upper jacket extending along the central axis between an upper jacket lower end and an upper jacket upper end, with an actuator configured to impart a pressure between the lower jacket and the upper jacket to move the upper jacket from an extended operating position to a retracted stowed position.

11 Claims, 17 Drawing Sheets

AUTOMATIC STOW COLUMN

CROSS-REFERENCE TO RELATED APPLICATION

This application claims the benefit of U.S. Provisional Application Ser. No. 63/289,954, filed Dec. 15, 2021, which is incorporated herein by reference in its entirety.

FIELD OF THE INVENTION

The following description relates to steering column assemblies and, more specifically, to retractable, stowable steering column assemblies for motor vehicles.

BACKGROUND OF THE INVENTION

Vehicles are increasingly being provided with power driven, telescoping steering columns. The power driven, telescoping steering columns have an actuator mounted to the steering column to effectuate power driven, telescoping movement of one or more coaxially aligned tubes, also known as jackets, of the steering column. The actuator typically able to move the coaxially aligned tubes for fine relative adjustment, so as to best position a steering member, such as a steering wheel, into a comfortable location for manual steering of the vehicle by a driver. Further yet, the actuator is typically configured to move the coaxially aligned tubes to a fully retracted, stowed position, thereby allowing easy ingress and egress for the driver. Additionally, in modern vehicles having an autonomous driving system, the steering column can be moved to the stowed position during while the vehicle is being driven autonomously, thereby allowing the driving extra space for enhanced comfort.

The ability to move the steering column to the stowed position during autonomous control presents an added challenge of providing an optimal supplemental inflation restraint, commonly referred to as air bag, due to the change in the spacing between the driver and the steering wheel during manual driving and autonomous driving modes. In the manual driving mode, the steering wheel is closer to the driver than when in the autonomous driving mode, and thus, the size of air bag needed during a vehicle crash varies. Accordingly, it is contemplated that a first size air bag be deployable when in the manual driving mode, and second size air bag be deployable when in the autonomous driving mode, while the steering wheel is in the stowed position, with the first size air bag being smaller than the second size air bag. Although multiple size air bags can prove effective, it comes with added costs and design challenges for the vehicle having to accommodate two separate air bags from different locations.

Accordingly, it is desired to provide a vehicle having an autonomous drive mode, whereat the steering column is moveable to a stowed position while in the autonomous drive mode, that enables a single air bag to be deployed regardless of the drive mode of the vehicle in a reliable and economical manner, while increasing the design flexibility of the vehicle and reducing the cost associated with the design, manufacture, and assembly of vehicle components.

SUMMARY OF THE INVENTION

According to one exemplary embodiment of the present invention, a power driven, telescoping steering column is provided. The power driven, telescoping steering column includes: a tubular lower jacket extending along a central axis between a lower jacket lower end and a lower jacket upper end; a tubular upper jacket extending along the central axis between an upper jacket lower end and an upper jacket upper end; a first actuator assembly configured to power relative telescoping movement between the tubular lower jacket and the tubular upper jacket to move the upper tubular jacket between a manual operating position and a stowed position during normal use; and a second actuator configured to impart a gas and/or fluid pressure between the tubular lower jacket and the tubular upper jacket to move the upper tubular jacket from the manual operating position to the stowed position during a crash condition.

According to another exemplary embodiment of the present invention, a telescoping steering column is provided. The telescoping steering column includes: a lower jacket extending along a central axis between a lower jacket lower end and a lower jacket upper end; an upper jacket extending along the central axis between an upper jacket lower end and an upper jacket upper end; and an actuator configured to impart a pressure between the lower jacket and the upper jacket to move the upper jacket from a first operating position to a stowed position.

In accordance with a further aspect of the disclosure, a method for causing a telescoping steering column to move from an extended position to a stowed position is provided. The method includes: providing an actuator configured to impart a pressure between a tubular lower jacket of the telescoping steering column and a tubular upper jacket of the telescoping steering column to move the tubular upper jacket in telescoping relation with the tubular lower jacket from the extended position to the stowed position.

These and other objects, advantages and features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
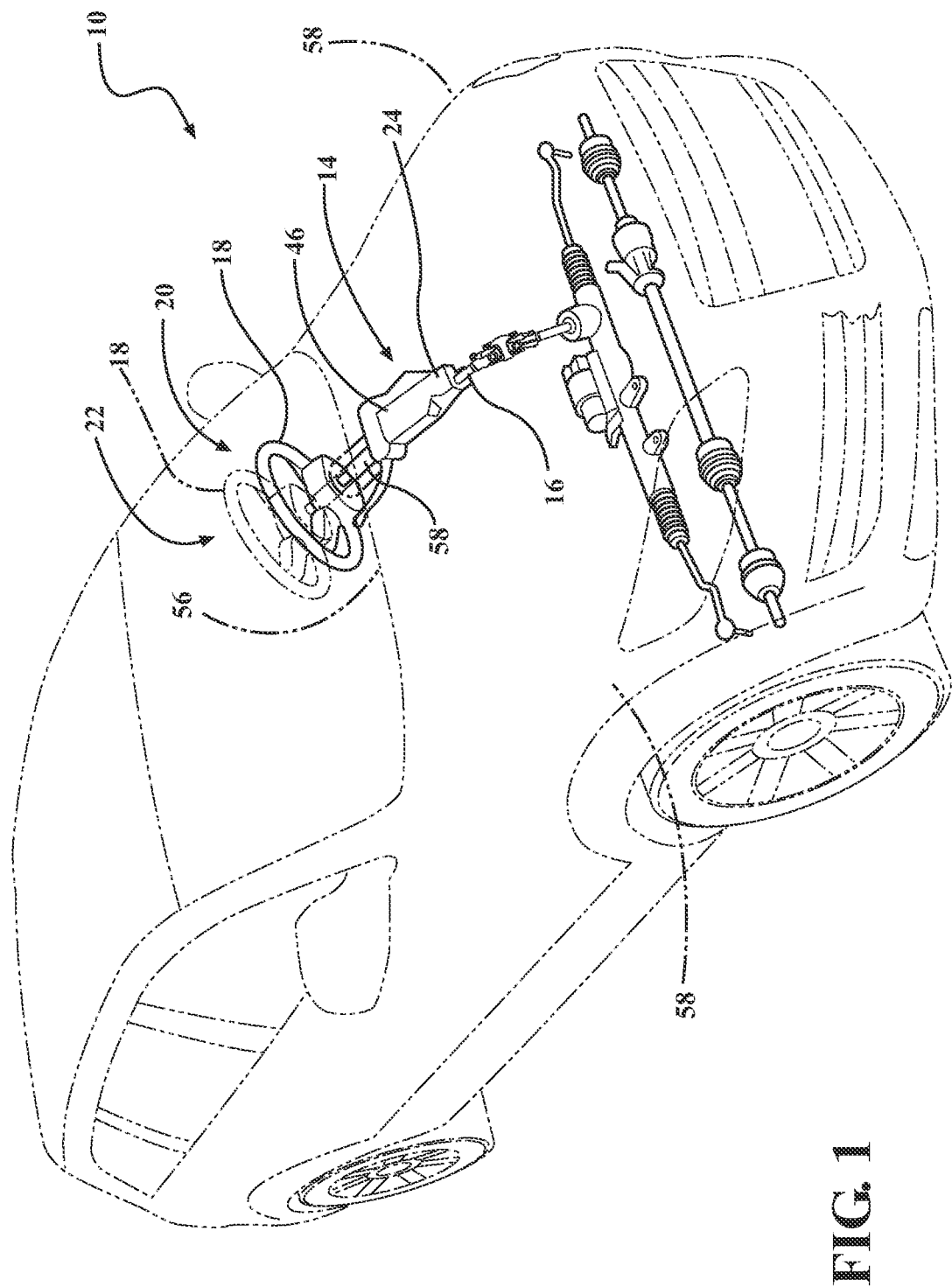
FIG. 1 is a schematic view of a vehicle and steering column assembly according to one embodiment of the disclosure.
Figure 2:
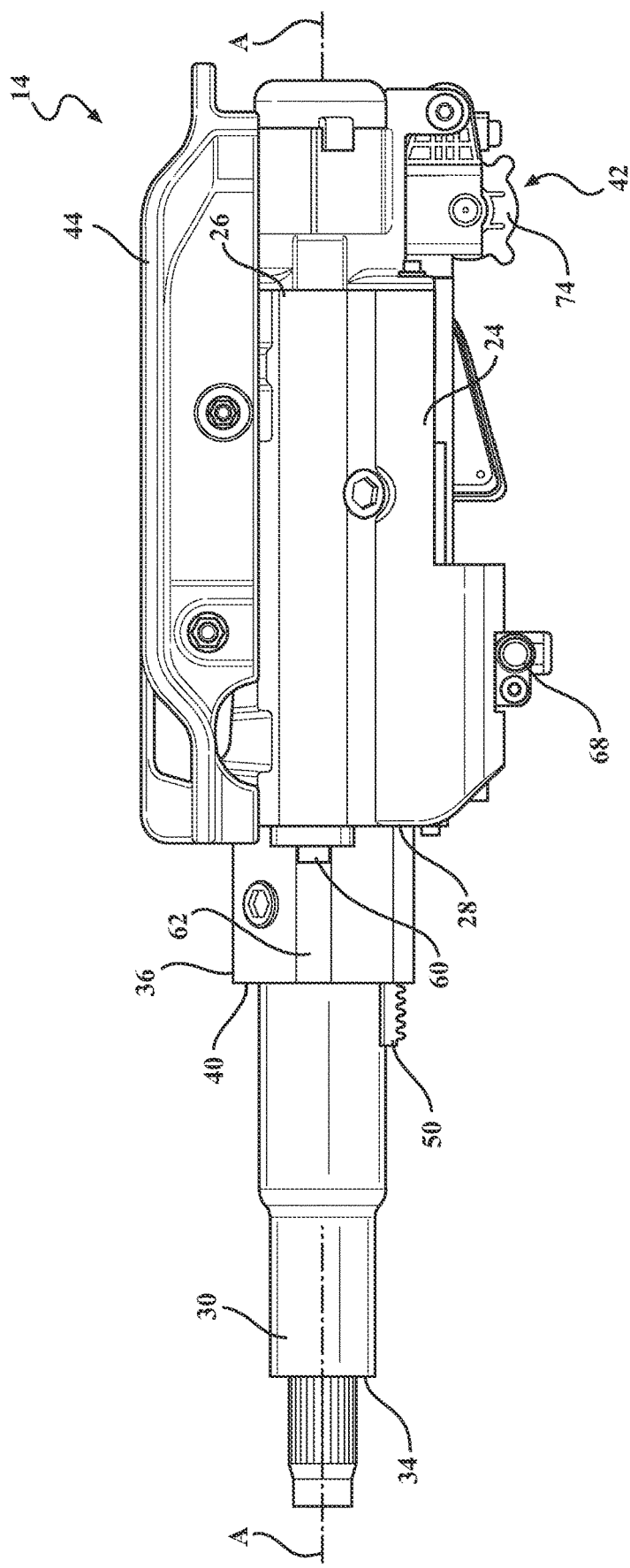
FIG. 2 is a side elevation view of a steering column assembly constructed in accordance with one embodiment of the disclosure shown in an extended position.
Figure 2A:
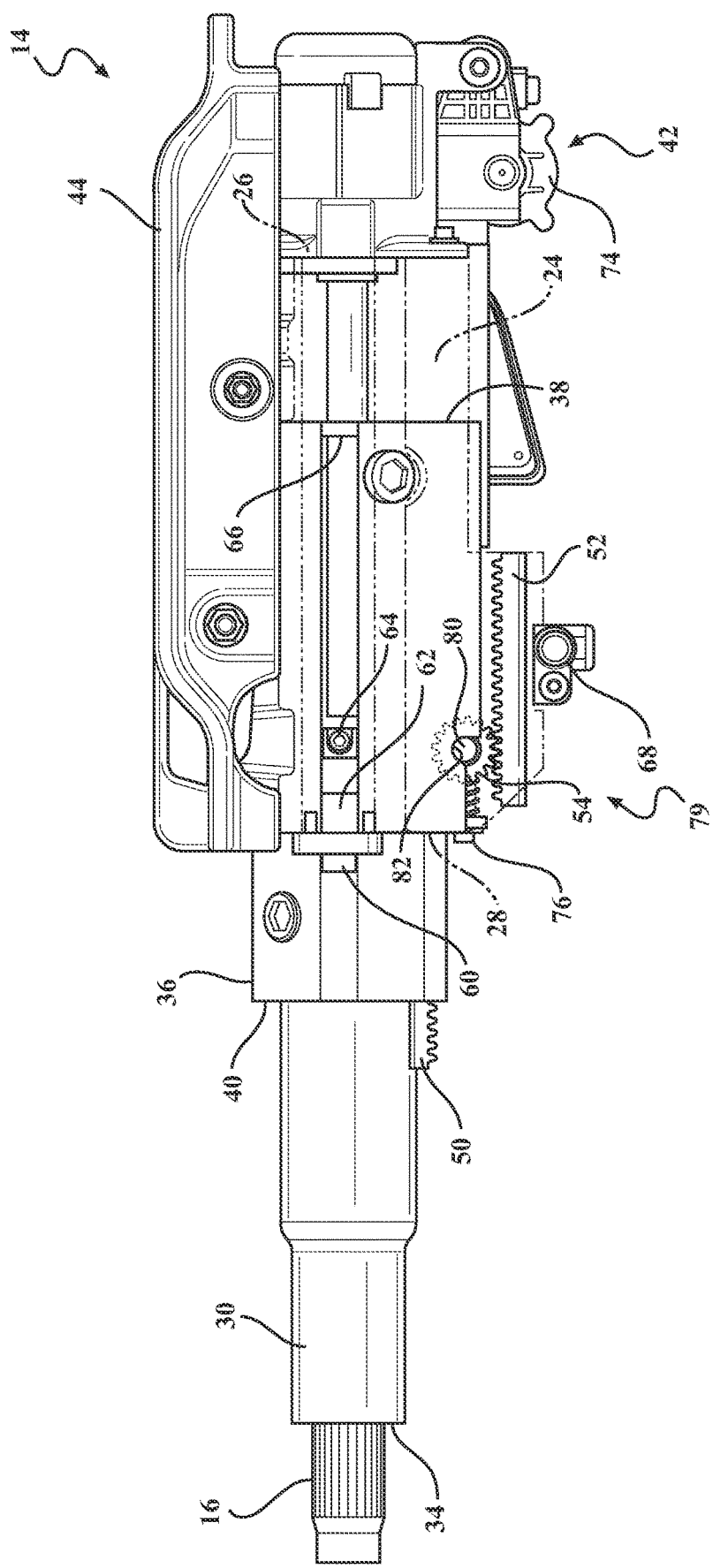
FIG. 2A is a view similar to FIG. 2 with a lower jacket of the steering column assembly shown in transparency for clarity purposes only.
Figure 3:
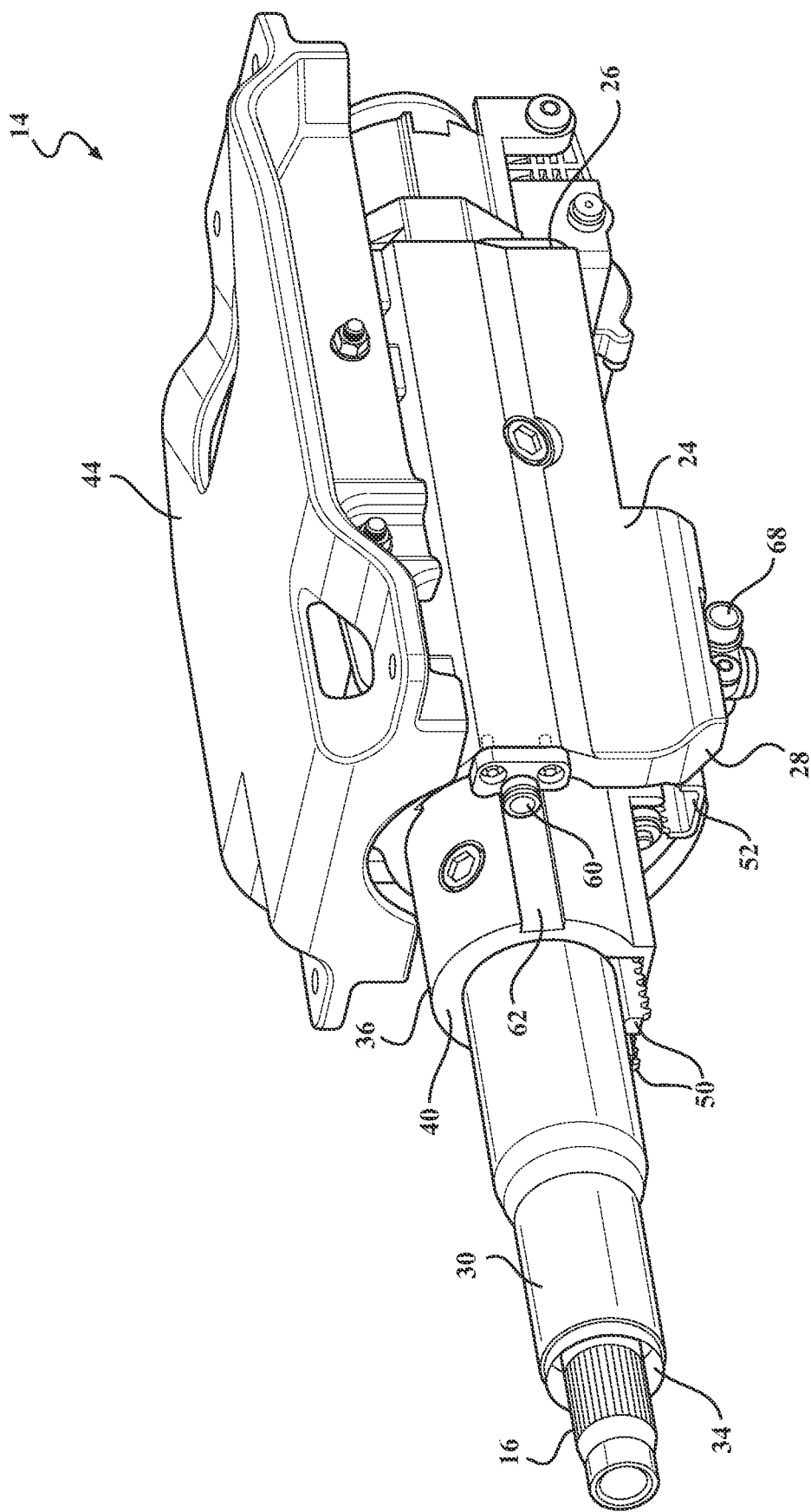
FIG. 3 is a top perspective view of the steering column assembly as shown in FIG. 2A.

Referring now to the Figures, where the invention will be described with reference to specific embodiments, without limiting same, FIG. 1 illustrates an exemplary vehicle 10, such as an autonomous driving assisted steering ("ADAS") equipped vehicle, having a power driven, telescoping steering column assembly 14. The steering column assembly 14, among other things, includes a steering column shaft 16 and a steering input device, such as a manually operable steering wheel 18, coupled thereto.

In the illustrated embodiment, steering column assembly 14 is movable between a retracted position, also referred to as stowed position 20, and an extended, also referred to as deployed or manual driving position 22. In the retracted position 20, portions of steering column assembly 14, such as steering wheel 18, are disposed away from the driver, which provides increased space for the driver. The displacement of the steering column shaft 16 and wheel 18 in retracted position 20 creates additional cabin space for the driver's comfort and convenience to perform non-driving activities including, but not limited to, reading, working, entertaining, eating, texting, etc. In the driving position 22, steering wheel 18 may be used by a driver to manually steer the vehicle. In certain embodiments, the position of the steering column shaft 16 and the steering wheel 18 can be selectively adjusted while in the driving position 22 to provide a desired position for the driver. The adjustable driving position may be stored or otherwise recorded when returning from a retracted position 20 to a driving position 22.

In certain embodiments, the steering wheel 18 can be automatically retracted in a retracted position 20 in response to the initiation of an autonomous driving event. Accordingly, while the vehicle 10 is being driven autonomously, without direct input from the driver, the same additional cabin space between the steering wheel 18 and the driver is provided while the vehicle is being driven. Similarly, the steering wheel 18 can be extended at any desired time to the driving position 22 to provide manual control to the driver at the termination of an autonomous driving event, or when an autonomous driving system requires the input of the driver. Accordingly, it may be desired to extend the steering wheel 22 to the driving position 22 rapidly to provide control to the driver as required. The controlled movement of the steering column assembly 14 during normal use between the stowed position 20 and the extended position 22 can be facilitated via any suitable power actuator, also referred to as first actuator assembly 42.

Steering column assembly 14 includes a tubular lower jacket, also referred to as tubular outer jacket 24, extending along a central axis A between an outer jacket lower end 26 and an outer jacket upper end 28. A tubular upper jacket, also referred to as tubular inner jacket 30 extends along the central axis A between an inner jacket lower end 32 and an inner jacket upper end 34. A tubular middle jacket, also referred to as tubular intermediate jacket 36, extends along the central axis A between an intermediate jacket lower end 38 and an intermediate jacket upper end 40. The intermediate jacket lower end 38 is configured for telescopic movement relative to the tubular outer jacket 24 and the intermediate jacket upper end 40 is configured for telescopic movement relative to the tubular inner jacket 30. The first actuator assembly 42 is configured to power the relative telescoping movement between the intermediate jacket lower end 38 and the tubular outer jacket 24 and between the intermediate jacket upper end 34 and the tubular inner jacket 30, such that the first actuator 42 can move the steering column assembly between the extended position 22 and the stowed position during normal use. A power column actuator mounting bracket, referred to hereafter as mounting device 44, is operably coupled against relative axial movement with the tubular outer jacket 24. The mounting device 44 is operably coupled to the actuator assembly 42, such that upon selective actuation of the actuator assembly 42, the intermediate jacket lower end 38 moves in telescoping relation with the tubular outer jacket 24 and the intermediate jacket upper end 40 moves in telescoping relation with the tubular inner jacket 30.

In the non-limiting embodiment illustrated, the intermediate jacket lower end 38 is disposed in the outer jacket upper end 28 for low friction sliding translation within the tubular outer jacket 24 along the central axis A, and the inner jacket lower end 32 is disposed in the intermediate jacket upper end 40 for low friction sliding translation within the intermediate jacket 36 along the central axis A. Accordingly, the outer jacket 24, intermediate jacket 30, and the inner jacket 30, in accordance with one aspect, can be oriented in coaxial relation with one another for straight, linear translation relative to one another. It is contemplated herein that the outer jacket 24, intermediate jacket 30, and the inner jacket 30 can have round, also referred to as circular walls, or non-round walls, such as square or rectangular, by way of example and without limitation, and could move along the central axis A in non-coaxial relation with one another.

The tubular outer jacket 24 is configured to be attached to a vehicle body frame member 46 via mounting bracket 44 against relative movement therewith.

Figure 4:
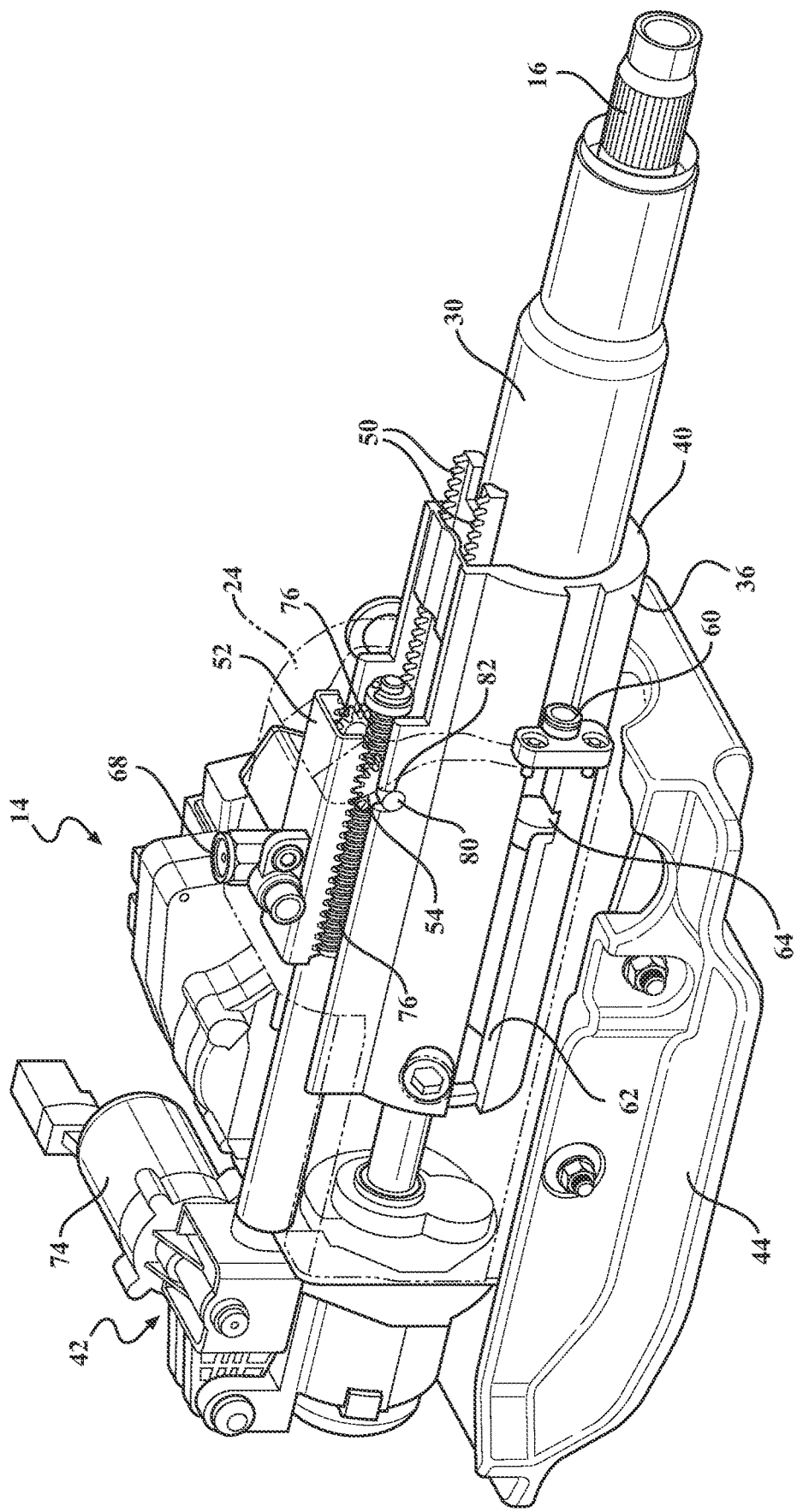
FIG. 4 is a bottom perspective view of the steering column assembly as shown in FIG. 2A.
Figure 5:
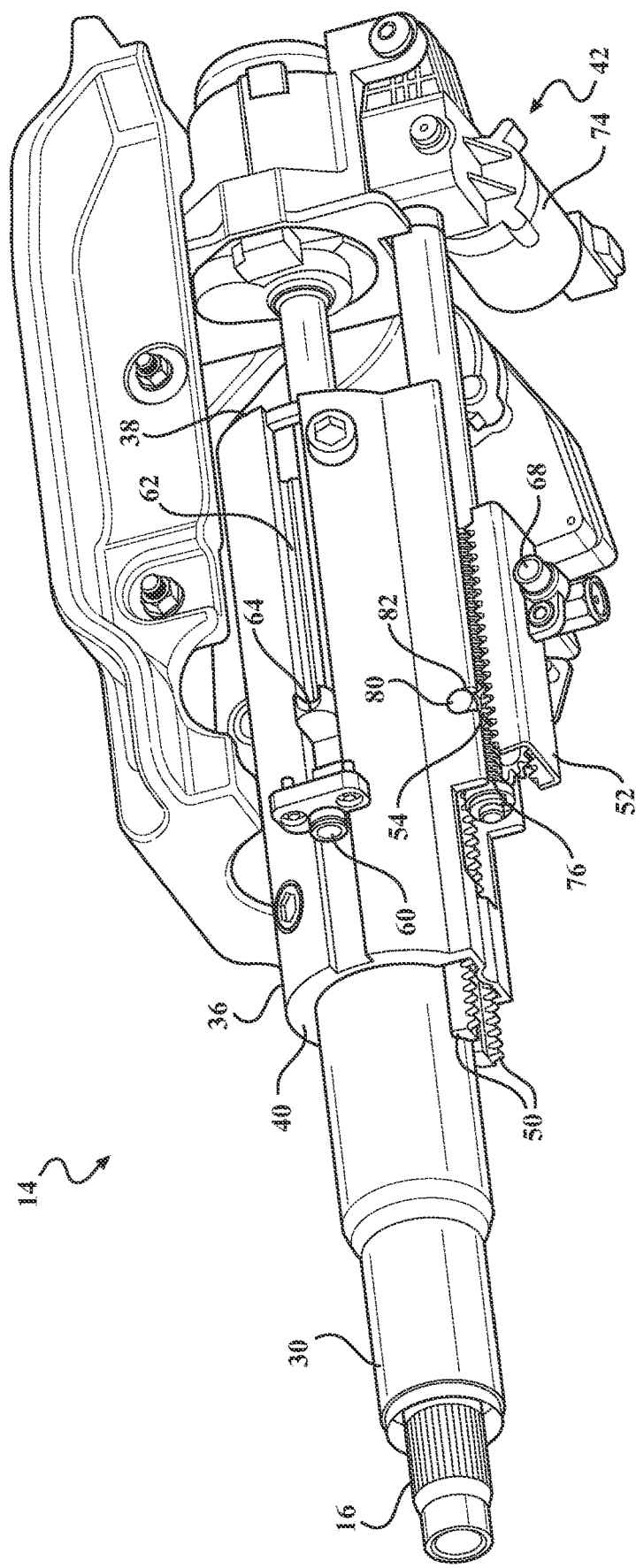
FIG. 5 is a perspective view of a mounting device of the steering column assembly of FIGS. 2A and 2B.

Actuator assembly 42, by way of example and without limitation, can be provided having a motor 74 configured to rotatably drive a screw 76 (best shown in FIG. 4), with screw 76 being arranging to drive a nut 78 for translation in parallel relation to central axis A along screw 76 to drive a gear assembly 79 operably coupling the tubular upper jacket 30 and the tubular lower jacket 24 to one another. Gear assembly 79 includes an upper gear rack 50 fixed to the tubular upper jacket 30, a lower gear rack 52 releasably fixed to the tubular lower jacket 24, and at least one, and shown as a pair of pinion gears 54 meshed with the lower gear rack 52 and the upper gear rack 50 to operably couple the upper gear rack 50 with said lower gear rack 52, thereby operably coupling tubular lower jacket 24 with tubular upper jacket 30. Nut 78 has a pair of trunnions 80 fixed thereto, with trunnions 80 extending outwardly from opposite sides of nut 78 for releasable receipt in trunnion pockets, also referred to as notches 82 formed in tubular intermediate jacket 36. Trunnions 80 each support one of the pinion gears, also referred to as trunnion gears 54, for rotation thereon.

A second actuator 60 is configured to impart a pressure, such as gas and/or fluid pressure, between the tubular lower jacket 24 and the tubular upper jacket 30 to move the tubular upper jacket 30 from the extended manual operating position 22 to the stowed position 20 during a crash condition. The second actuator 60 can be triggered or actuated, also referred to as ignited, in response to a signal detecting the crash condition, such as used to deploy an air bag, as will be understood by a person possessing ordinary skill in the art of air bag ignitors. As such, with the steering column assembly 14 moving from the extended manual operating position 22 to the stowed position 20, such as within milliseconds during the crash condition, an increased amount of space is immediately provided between the driver and the steering wheel 18, thereby providing the same amount of space for an air bag to deploy as compared to if the steering column assembly 14 had originally been in the stowed position 20 prior to the crash condition, such as when the vehicle 10 is in the autonomous driving mode. As such, a single air bag can be used to deploy within the single sized space, corresponding to the size of the space provided when the steering column assembly 14 is in the stowed position, regardless of the position, i.e extended or stowed, of the steering column assembly 14 immediately prior to the crash condition. Thus, the need for multiple sizes of air bags to be deployed from different locations within the vehicle 10 is negated. Accordingly, a single air bag can be used for all positions of the steering column assembly 14, wherein the single air bag can be disposed in a single location, such as in the steering wheel 18, on the steering column assembly 14, in a dashboard 56, or in a side panel 58 of a passenger door, by way of example and without limitation.

The second actuator 60 can be provided as a first pyrotechnic actuator, such as used with air bag deployment. The first pyrotechnic actuator 60 imparts a gas pressure P between the tubular lower jacket 24 and the tubular upper jacket 30 to move the tubular upper jacket 30 from the manual operating extended position 22 to the stowed position 20 during a crash condition.

Figure 13:
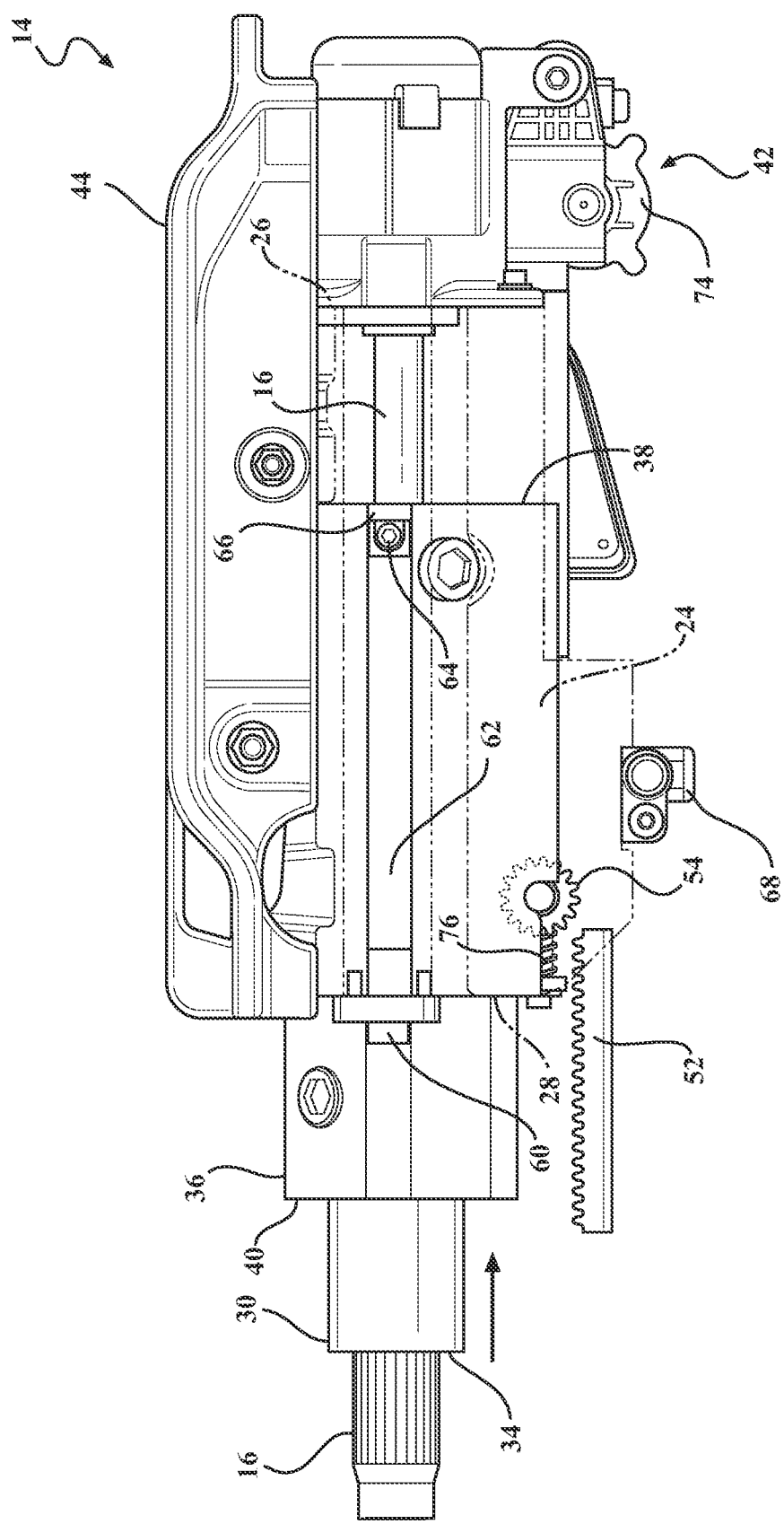
FIG. 13 is a view similar to FIG. 12 illustrating the reaction member of the tubular upper jacket engaging a stop surface of a tubular intermediate jacket of the steering column assembly.
Figure 13A:
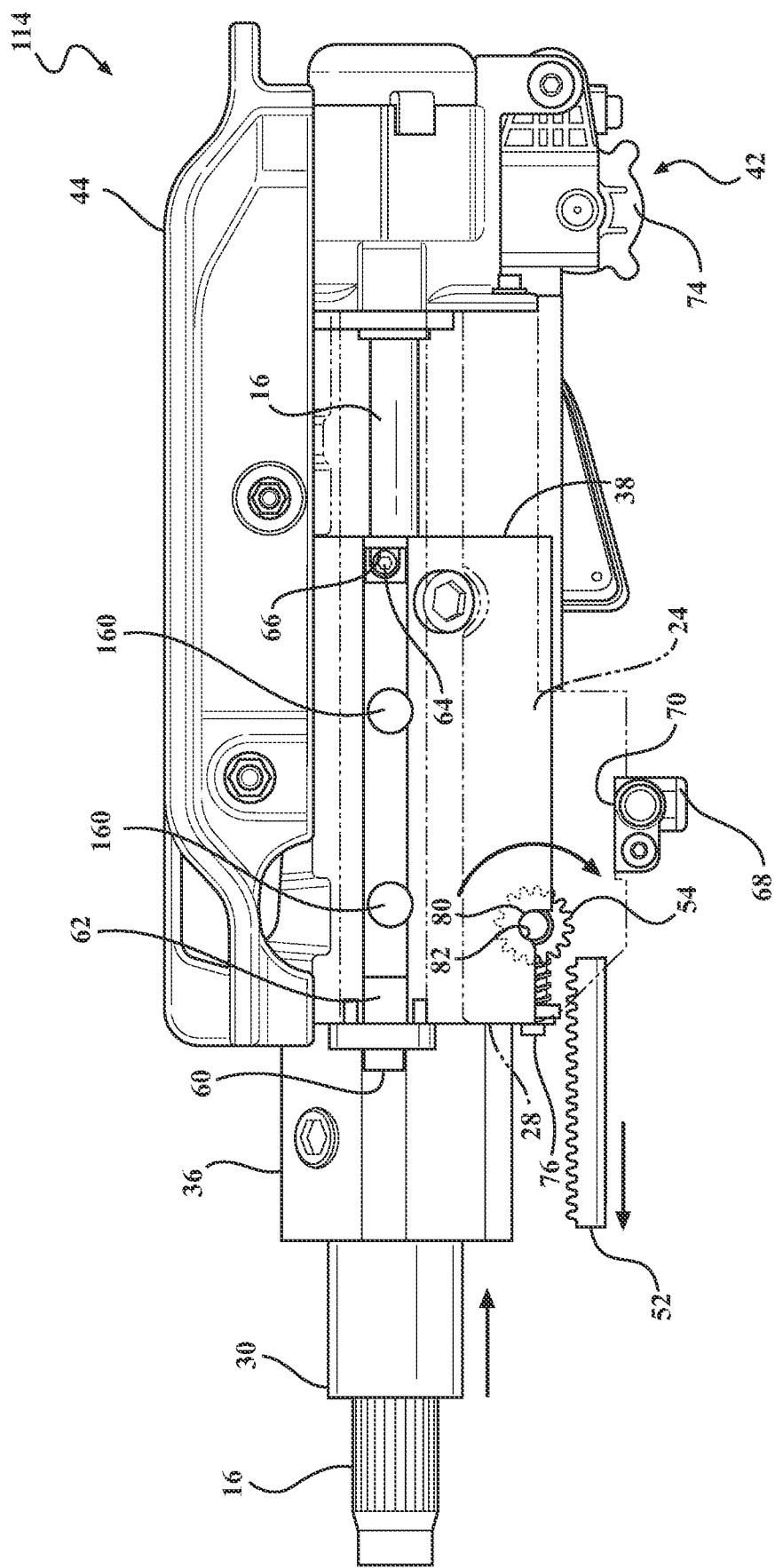
FIG. 13A is a view similar to FIG. 13 illustrating another embodiment including a plurality of supplemental collapsing actuators configured to facilitate movement of the tubular upper and intermediate jackets to the stowed position.

To channel the gas to produce the desired pressure P, the tubular intermediate jacket 36 is shown having a gas/reaction member pocket, also referred to as cavity 62, extending generally parallel to the central axis A to contain the gas under pressure therein. A piston, also referred to as reaction member 64, which is fixed to the tubular upper jacket 30, is disposed within the cavity 62, wherein the gas pressure P acts on the reaction member 64 to cause the reaction member 64 to translate through the cavity 62, thereby causing the tubular upper jacket 30 to move toward the stowed position 20. The cavity 62 extends to a stop surface 66, with the reaction member 64 being configured to engage the stop surface 66 upon translating through full length of the cavity 62. Upon the reaction member 64 engaging the stop surface 66, the translating movement of the tubular upper jacket 30 causes the tubular upper jacket 30 and the tubular intermediate jacket 36 to move conjointly with one another to the stowed position. As shown in FIG. 13A, a steering column assembly 114 constructed in accordance with a further embodiment is shown, wherein the same reference numerals are used to identify like features, one or more additional actuators 160 can be deployed along the cavity 62, as desired, to facilitate movement of the reaction member 64 along the full length of the cavity 62.

To allow movement of the tubular intermediate jacket 36 relative to the tubular lower jacket 24 without impedance by the gear assembly 79, a decoupler actuator, also referred to as third actuator 68, is configured to decouple the gear assembly 79. The third actuator 68 causes the upper gear rack 50 to be released from fixation from the tubular lower jacket 24 upon the third actuator 68 being actuated during the crash condition. The third actuator 68 can be provided as a second pyrotechnic actuator in similar fashion as the first pyrotechnic actuator of second actuator 60, wherein upon the third actuator 68 being ignited, a pin 70, by way of example and without limitation, can be moved from a coupled, pinned connection between the lower gear rack 52 and the tubular lower jacket 24 to a decoupled, unpinned disconnection, thereby causing the lower gear rack 52 to be detached for free movement relative to the tubular lower jacket 24. The third actuator 68 can be configured to be actuated either before the second actuator 60 or simultaneously with the second actuator 60 during the crash condition.

In FIGS. 6-15, a sequence of events of the steering column assembly 14 is shown while experiencing a detected crash condition, such as from one or more sensors configured in communication with a vehicle control unit, as discussed above, to cause the steering column assembly 14 to move from a first extended operating position to a second retracted stowed position.

Figure 6:
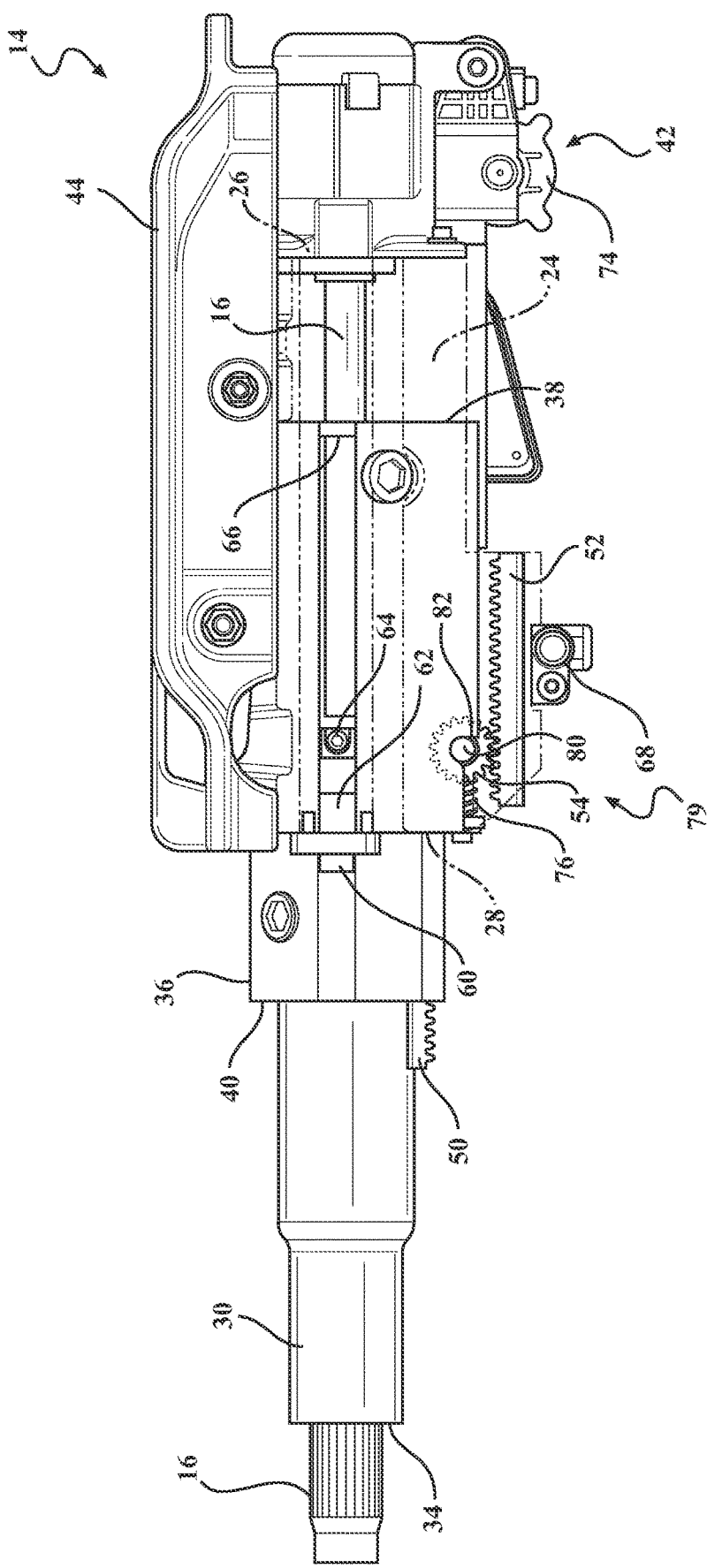
FIG. 6 is a view similar to FIG. 2A illustrating an initial stage of actuation of a decoupling actuator to initiate a retraction of the steering column assembly from the extended position to a stowed position during a crash condition.
Figure 7:
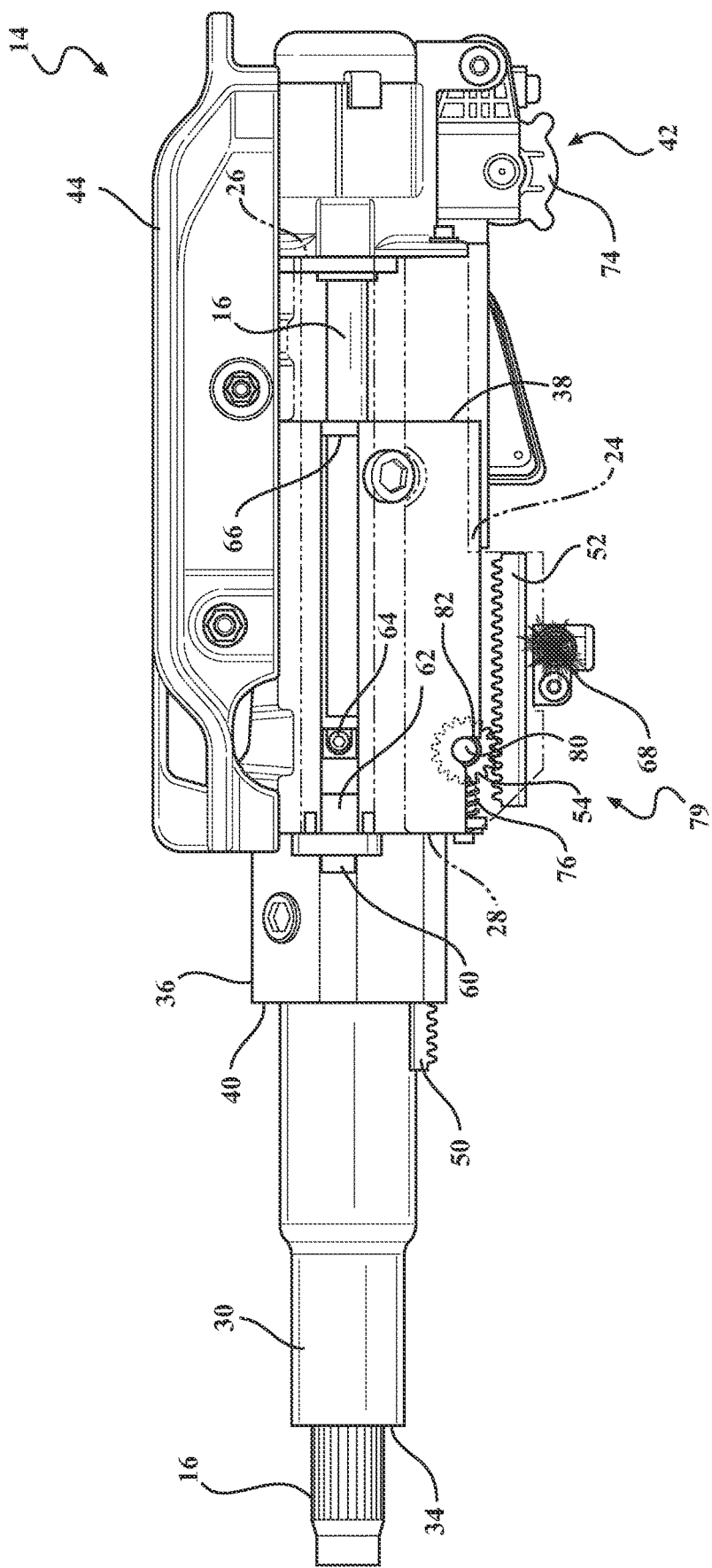
FIG. 7 is a view similar to FIG. 6 illustrating the decoupling actuator assembly being actuated.
Figure 8:
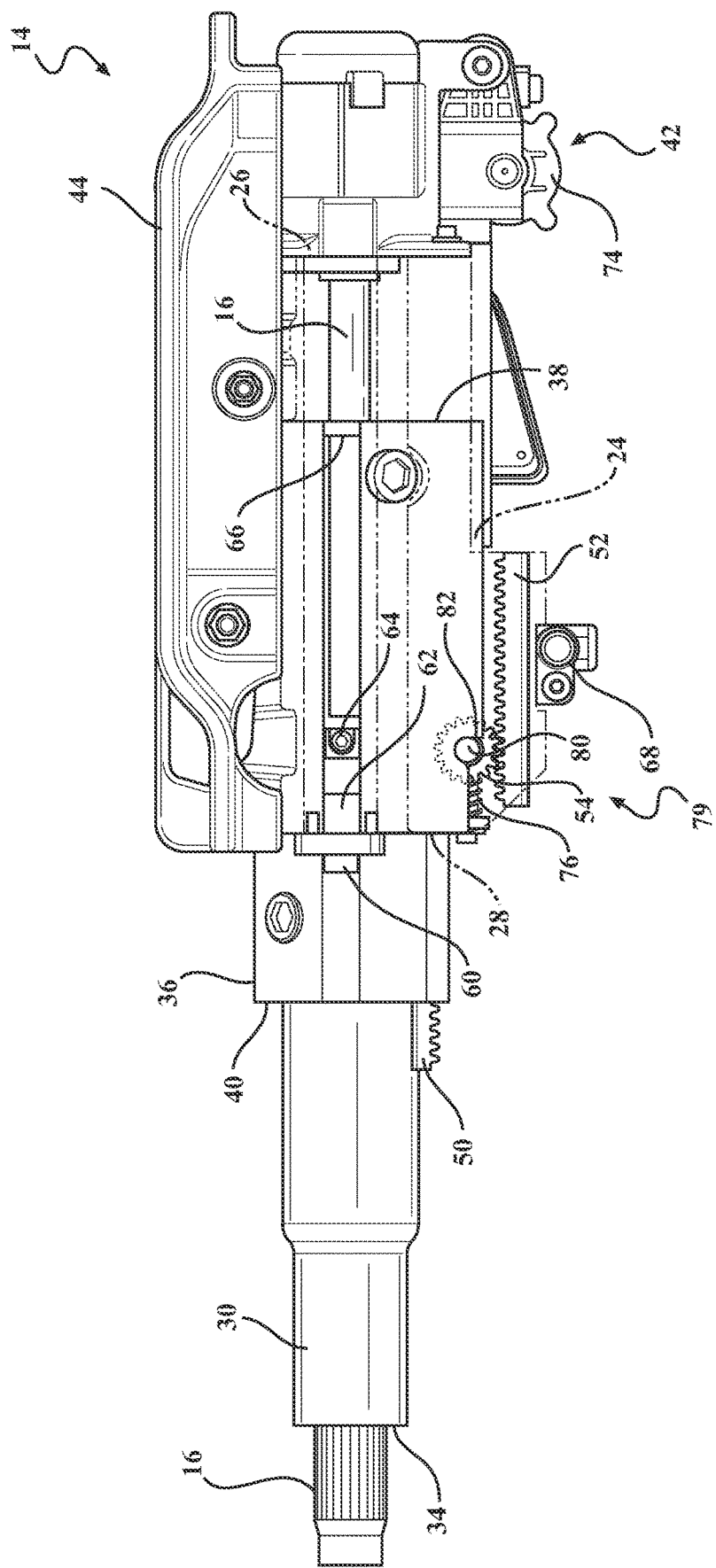
FIG. 8 is a view similar to FIG. 7 upon the decoupling actuator being actuated to release a lower gear rack from fixation with a tubular lower jacket of the steering column assembly.
Figure 9:
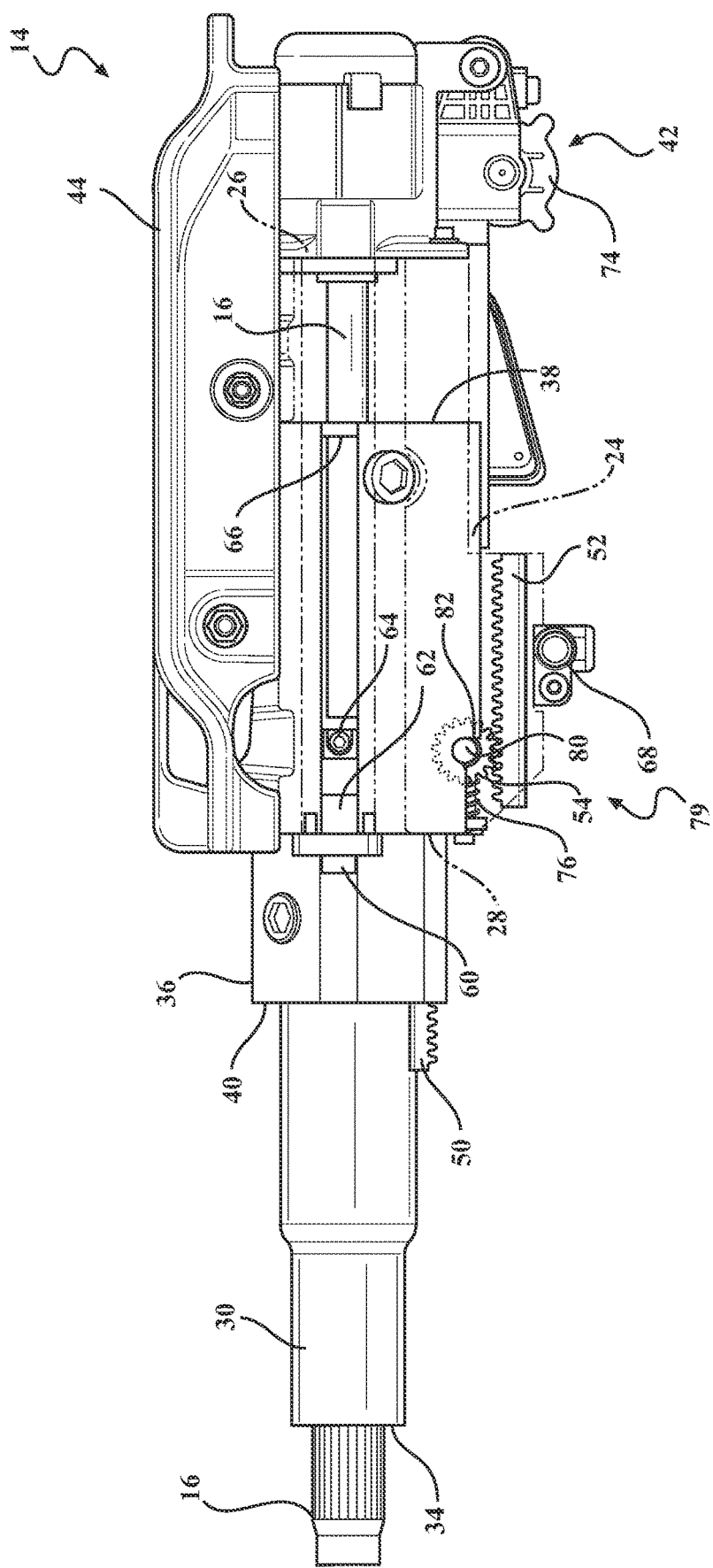
FIG. 9 is a view similar to FIG. 8 illustrating an initial stage of actuation of a collapsing actuator to initiate a retraction of the steering column assembly from the extended position to the stowed position.
Figure 10:
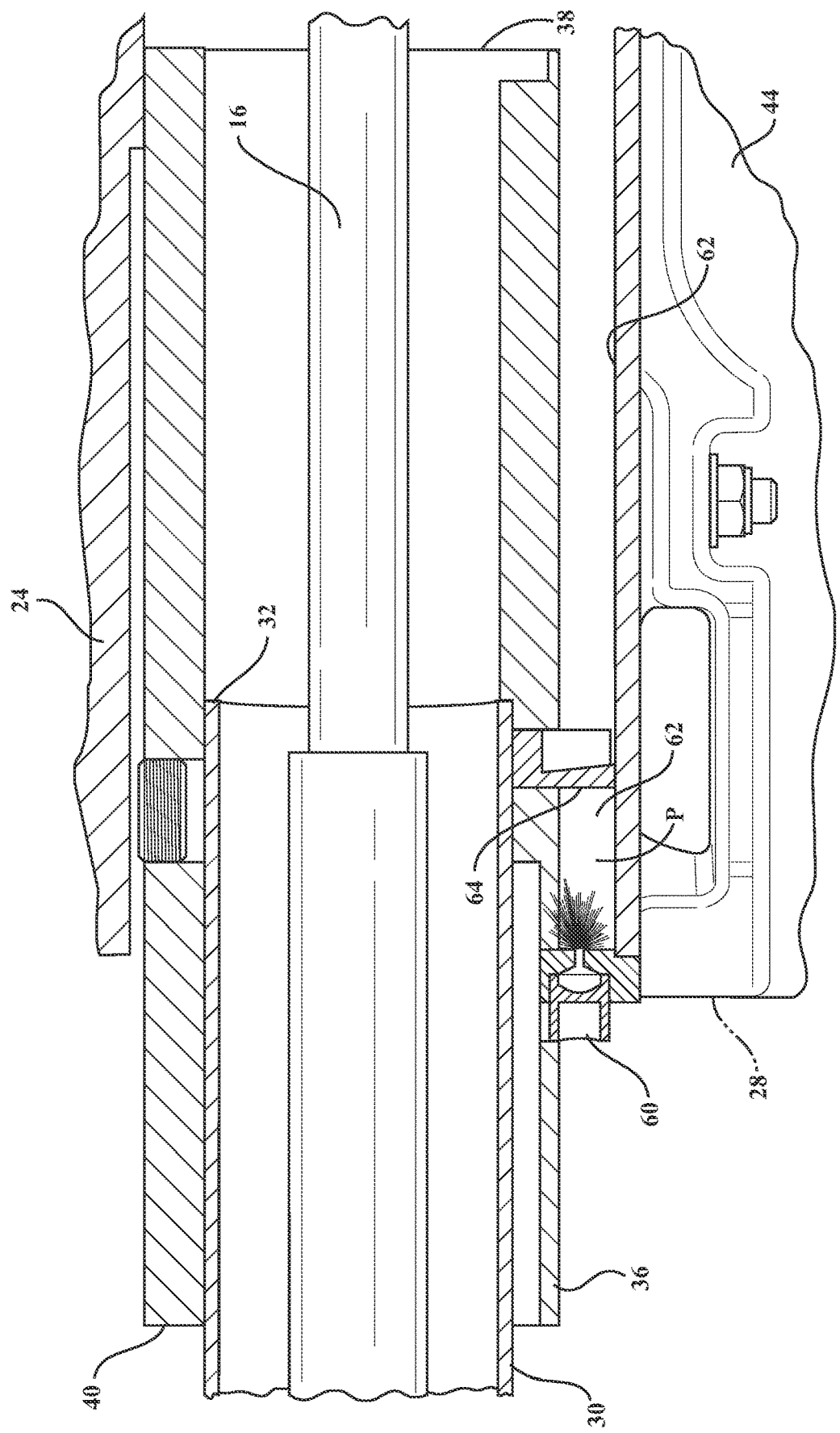
FIG. 10 is a view similar to FIG. 9 illustrating the collapsing actuator being actuated and a tubular upper jacket of the steering column assembly being collapsed axially in response to pressure acting on a reaction member fixed to the tubular upper jacket.
Figure 11:
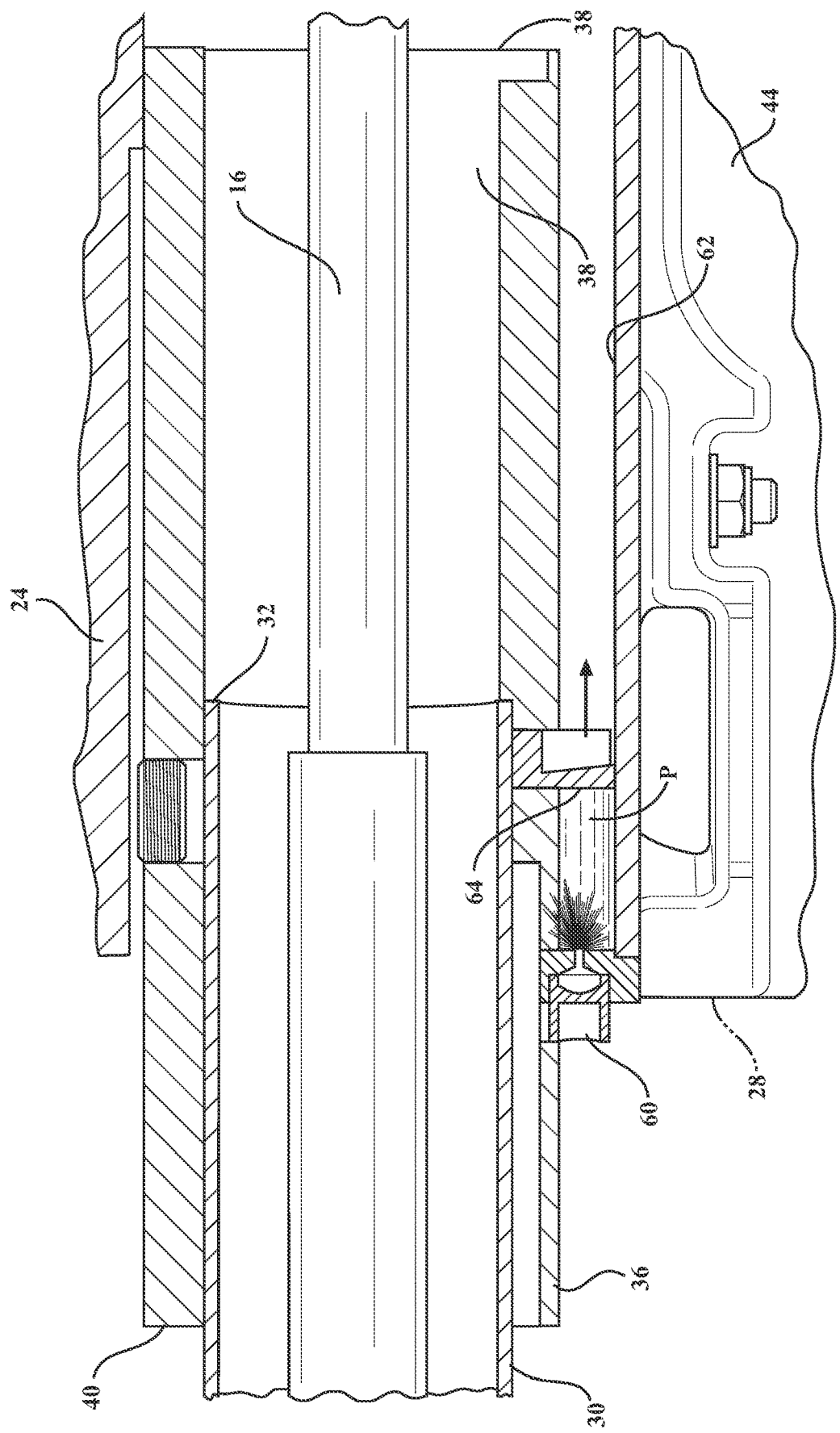
FIG. 11 is a view similar to FIG. 10 illustrating a continuation of the tubular upper jacket being collapsed axially.
Figure 12:
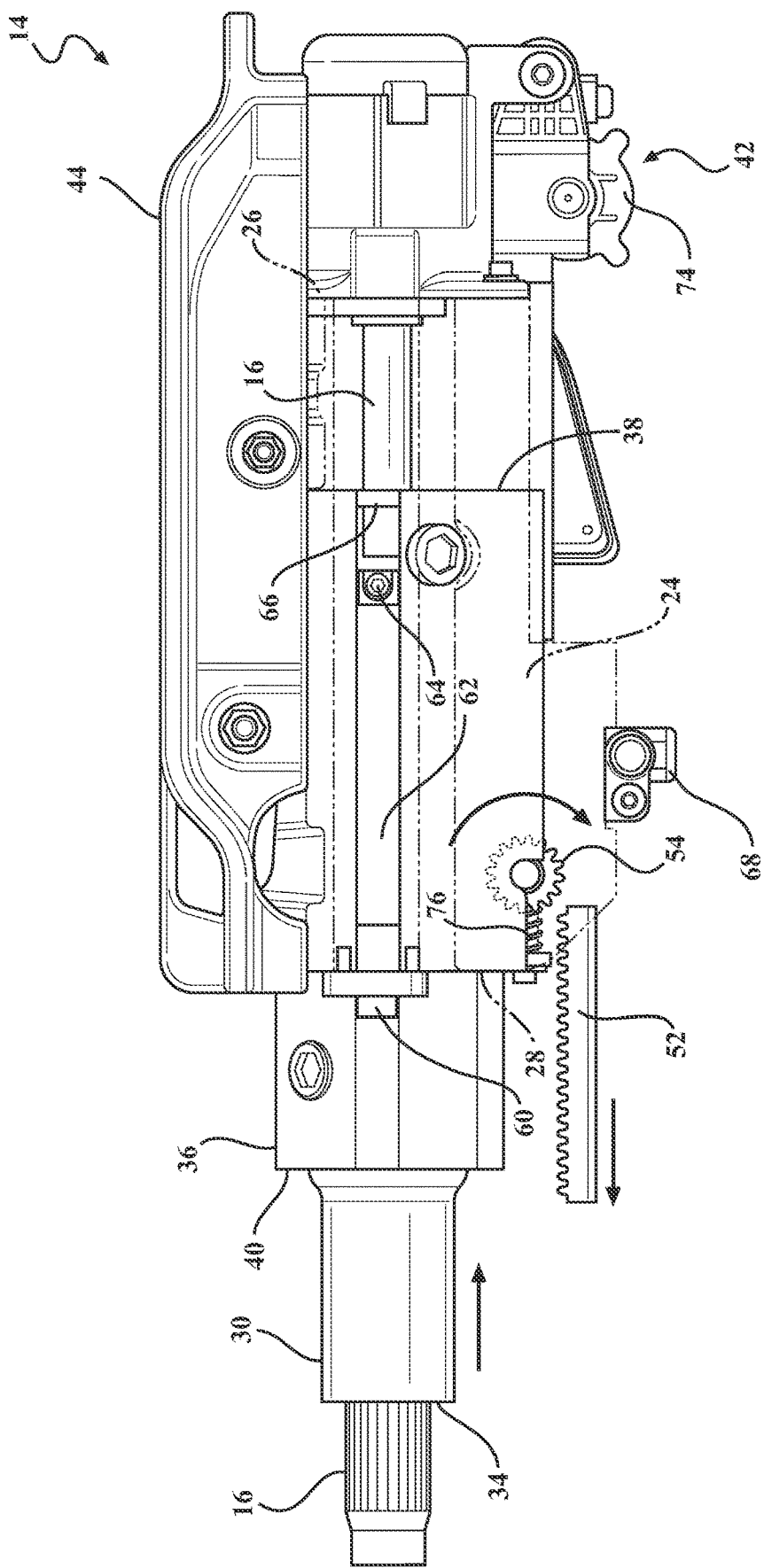
FIG. 12 is a view similar to FIG. 11 illustrating the lower gear rack being ejected axially in response to the tubular upper jacket being collapsed axially.
Figure 14:
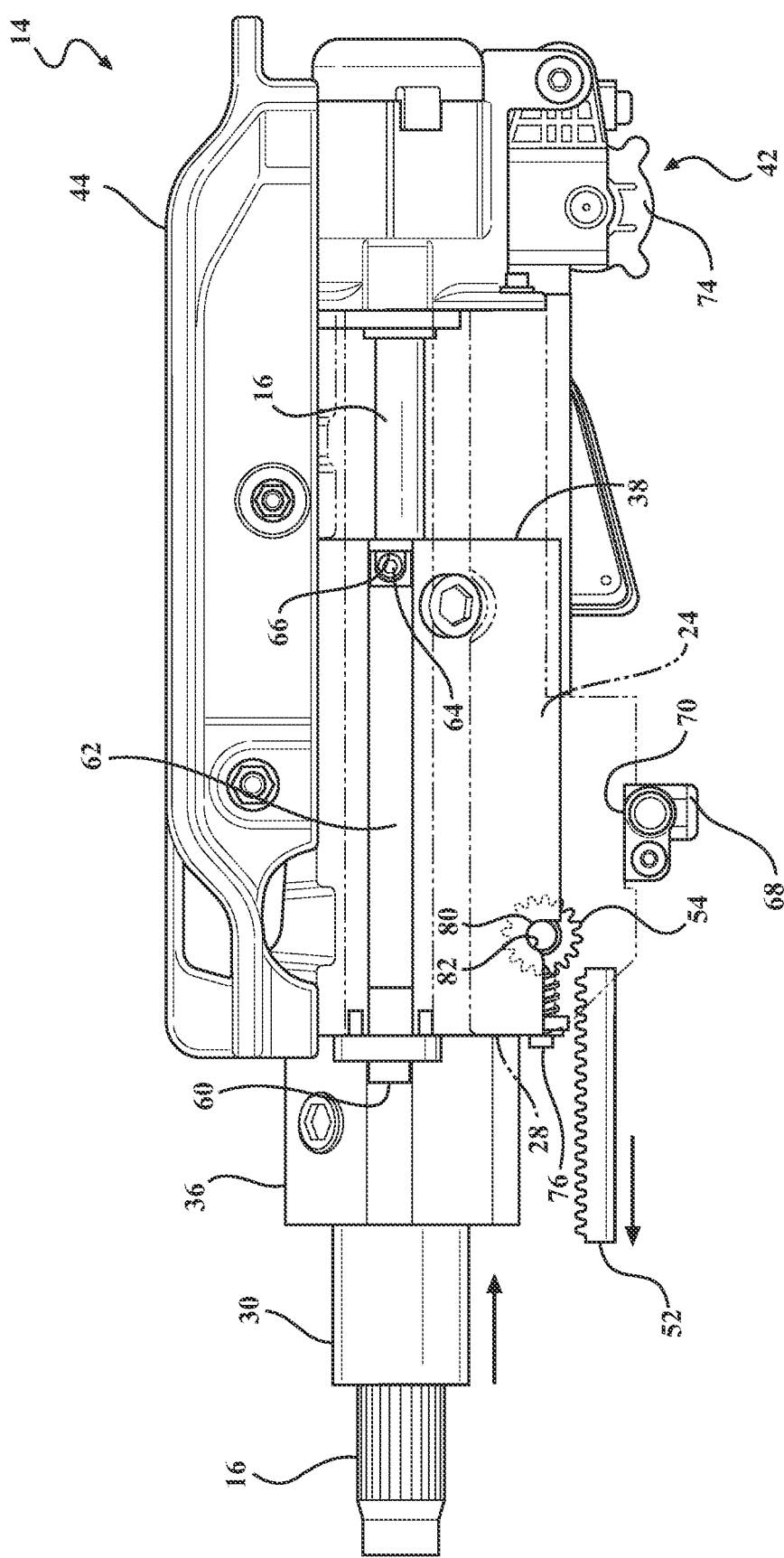
FIG. 14 is a view similar to FIG. 13 illustrating a pinion gear being moved out from meshed engagement from an upper gear rack fixed to the tubular upper jacket upon the lower gear rack being ejected and moved out from meshed engagement from the lower gear rack to facilitate movement of the tubular upper and intermediate jackets to the stowed position.
Figure 15:
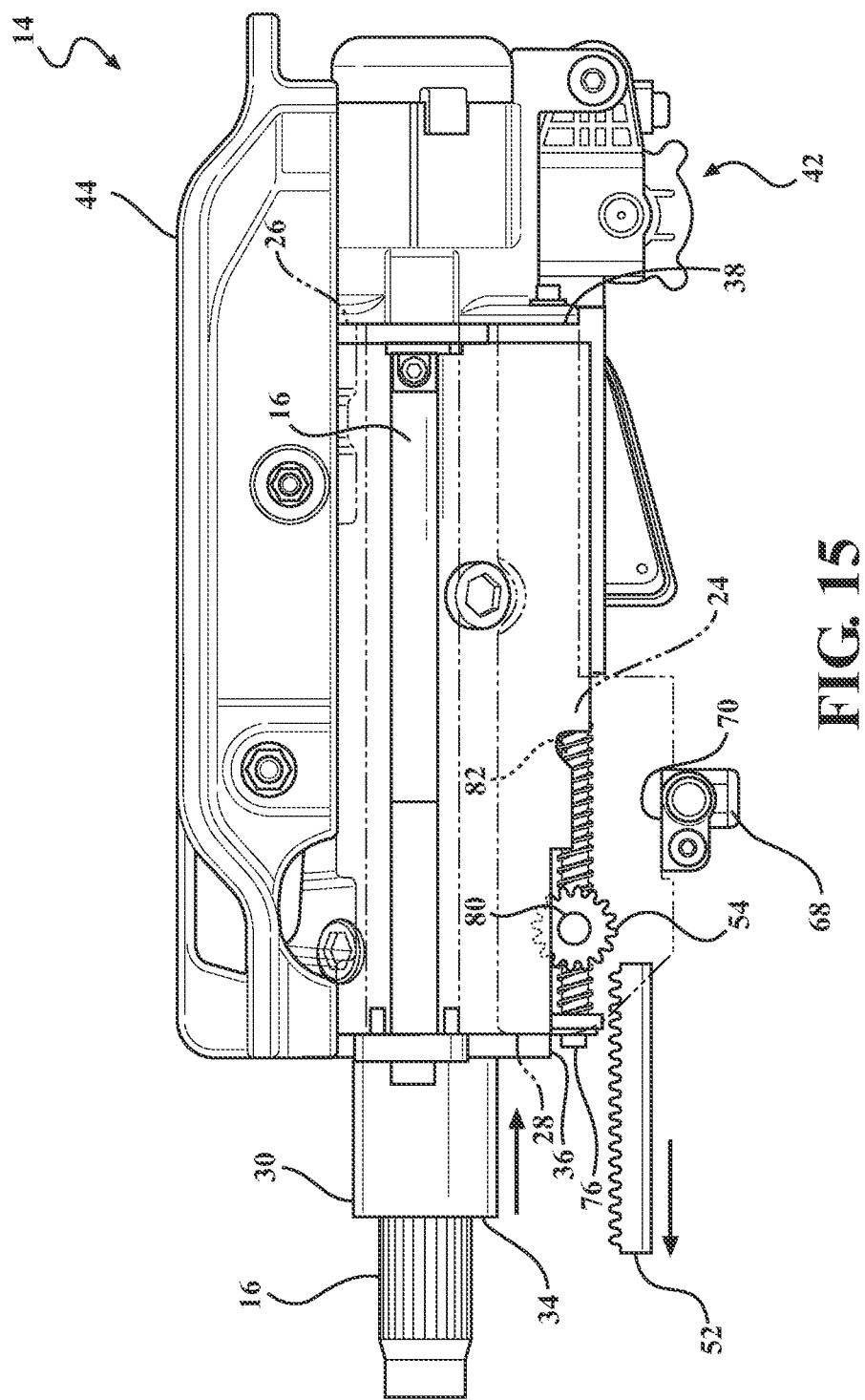
FIG. 15 is a view similar to FIG. 14 illustrating the tubular upper and intermediate jackets moved fully to the stowed position.

In FIGS. 6-8, the third actuator 68 is first actuated to detach the lower rack 52 from the tubular lower jacket 24. A pin, by way of example and without limitation is pulled or otherwise remove from coupling the lower rack 52 to the tubular lower jacket 24 (FIG. 8). Within milliseconds, or simultaneously, as shown in FIG. 9-10, the second actuator 60 is actuated to produce a high pressure, such as from a gas, within the cavity 62. As the gas pressure acts on the reaction member 64 (FIG. 11), the tubular upper jacket 30 is driven along the central axis A in telescopic fashion relative to the tubular intermediate jacket 36. As the tubular upper jacket 30 translates along central axis A, pinion gear 54 is rotate, whereupon a rotational force from pinion gear 54 acting on lower rack 52 causes lower rack 52 to be translated and ejected outwardly from tubular lower jacket 24. This ejection of lower rack 52 is made possible due to the separation of lower rack 52 from tubular lower jacket 24 caused by actuation of the third actuator 68. In FIG. 13, reaction member 64 is shown having traversed the full length of cavity 62, whereupon reaction member 64 forcibly engages a stop surface 66 of tubular intermediate jacket 36. The force from reaction member 64 acting on stop surface 66 causes tubular intermediate jacket 36 to move conjointly with tubular upper jacket 30 along central axis A. The conjoint movement of tubular intermediate jacket 36 with tubular upper jacket 30 is made possible by pinion gear 54 being moved out from meshed engagement with upper rack 50 via trunnion 80 being displace outwardly from notch 82 (FIG. 14). Then, upper and intermediate jackets 30, 36 continue to translate until they reach the fully collapsed and stowed position (FIG. 15).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:

1. A power driven, telescoping steering column, comprising:
    a tubular lower jacket extending along a central axis between a lower jacket lower end and a lower jacket upper end;
    a tubular upper jacket extending along said central axis between an upper jacket lower end and an upper jacket upper end;
    a first actuator assembly configured to power relative telescoping movement between said tubular lower jacket and said tubular upper jacket to move said tubular upper jacket between a manual operating position and a stowed position during normal use;
    a second actuator configured to impart a gas and/or fluid pressure between said tubular lower jacket and said tubular upper jacket to move said tubular upper jacket from the manual operating position to the stowed position during a crash condition;
    wherein said second actuator is a pyrotechnic actuator that imparts a gas pressure between said tubular lower jacket and said tubular upper jacket to move said tubular upper jacket from the manual operating position to the stowed position during a crash condition;
    a tubular intermediate jacket disposed between said tubular lower jacket and said tubular upper jacket, said tubular intermediate jacket being configured for telescopic movement relative to said tubular lower jacket and said tubular upper jacket when said tubular upper jacket moves toward said stowed position; and
    wherein said tubular intermediate jacket has a cavity extending generally parallel to said central axis, and further including a reaction member disposed within said cavity, the gas pressure being configured to act on said reaction member to cause said reaction member to translate through said cavity, whereupon said tubular upper jacket is caused to move toward said stowed position.

2. The power driven, telescoping steering column of claim 1, wherein said reaction member is fixed to said tubular upper jacket.

3. The power driven, telescoping steering column of claim 1, wherein said cavity extends to a stop surface, said reaction member being configured to engage said stop surface upon translating through said cavity, whereupon said tubular upper jacket and said tubular intermediate jacket are biased by the gas pressure to move conjointly relative to said tubular lower jacket to the stowed position.

4. A power driven, telescoping steering column, comprising:
    a tubular lower jacket extending along a central axis between a lower jacket lower end and a lower jacket upper end;
    a tubular upper jacket extending along said central axis between an upper jacket lower end and an upper jacket upper end;
    a first actuator assembly configured to power relative telescoping movement between said tubular lower jacket and said tubular upper jacket to move said tubular upper jacket between a manual operating position and a stowed position during normal use;
    a second actuator configured to impart a gas and/or fluid pressure between said tubular lower jacket and said tubular upper jacket to move said tubular upper jacket from the manual operating position to the stowed position during a crash condition; and
    a gear assembly operably coupling said tubular upper jacket and said tubular lower jacket to one another, and further including a third actuator configured to decouple said gear assembly to allow said tubular upper jacket and said tubular lower jacket to move relative to one another without impedance by said gear assembly.

5. The power driven, telescoping steering column of claim 4, wherein said gear assembly includes an upper gear rack fixed to said tubular upper jacket, a lower gear rack releasably fixed to said tubular lower jacket, and a pinion gear meshed with said lower gear rack and said upper gear rack to operably couple said upper gear rack with said lower gear rack, said third actuator causing said upper gear rack to be released from fixation from said tubular lower jacket upon being actuated during the crash condition.

6. The power driven, telescoping steering column of claim 5, wherein said third actuator is a pyrotechnic actuator configured to be actuated either before said second actuator or simultaneously with said second actuator during the crash condition.

7. A telescoping steering column, comprising:
    a lower jacket extending along a central axis between a lower jacket lower end and a lower jacket upper end;
    an upper jacket extending along said central axis between an upper jacket lower end and an upper jacket upper end;
    a first pyrotechnic actuator configured to impart a pressure between said lower jacket and said upper jacket to move said upper jacket from a first operating position to a stowed position, said first pyrotechnic actuator imparts a gas pressure between said lower jacket and said upper jacket to move said upper jacket from the first operating position to the stowed position during a crash condition;
    an intermediate jacket disposed between said lower jacket and said upper jacket, said intermediate jacket being configured for telescopic movement relative to said lower jacket and said upper jacket when said upper jacket moves toward said stowed position; and
    a gear assembly operably coupling said upper jacket and lower jacket to one another, and further including a decoupler actuator configured to decouple said gear assembly to allow said upper jacket and said lower jacket to move relative to one another without impedance by said gear assembly.

8. The telescoping steering column of claim 7, wherein said decoupler actuator is a second pyrotechnic actuator configured to be actuated either before said first pyrotechnic actuator or simultaneously with said first pyrotechnic actuator during the crash condition.

9. A method for causing a telescoping steering column to move from an extended position to a stowed position, comprising:
   providing an actuator configured to impart a pressure between a tubular lower jacket of the telescoping steering column and a tubular upper jacket of the telescoping steering column to move said tubular upper jacket in telescoping relation with the tubular lower jacket from the extended position to the stowed position, and
   providing a gear assembly operably coupling said tubular upper jacket and tubular lower jacket to one another, and further including providing a decoupler actuator configured to decouple said gear assembly to allow said tubular upper jacket and said tubular lower jacket to move relative to one another without impedance by said gear assembly.

10. The method of claim 9, further including providing the actuator as a pyrotechnic actuator.

11. The method of claim 10, wherein the pressure is provided as a gas pressure.

* * * * *